(12) United States Patent
Peri

(10) Patent No.: US 12,240,097 B2
(45) Date of Patent: Mar. 4, 2025

(54) NON-DESTRUCTIVE DEVICE AND METHOD FOR SURVEYING, INSPECTION, AND CLEANING MARINE GROWTH AROUND OFFSHORE STRUCTURE

(71) Applicant: Subrahmanya Jahnu Peri, Secunderabad (IN)

(72) Inventor: Subrahmanya Jahnu Peri, Secunderabad (IN)

( * ) Notice: Subject to any disclaimer, the term of this patent is extended or adjusted under 35 U.S.C. 154(b) by 0 days.

(21) Appl. No.: 17/632,516

(22) PCT Filed: Sep. 8, 2021

(86) PCT No.: PCT/IB2021/058158
§ 371 (c)(1),
(2) Date: Feb. 2, 2023

(87) PCT Pub. No.: WO2023/007236
PCT Pub. Date: Feb. 2, 2023

(65) Prior Publication Data
US 2024/0017420 A1 Jan. 18, 2024

(51) Int. Cl.
*B25J 11/00* (2006.01)
*B25J 9/00* (2006.01)
*B63B 59/08* (2006.01)
*E02B 17/00* (2006.01)

(52) U.S. Cl.
CPC ......... *B25J 11/0085* (2013.01); *B25J 9/0084* (2013.01); *B63B 59/08* (2013.01); *E02B 17/0034* (2013.01); *B63B 2059/082* (2013.01)

(58) Field of Classification Search
None
See application file for complete search history.

(56) References Cited

U.S. PATENT DOCUMENTS

| | | | | |
|---|---|---|---|---|
| 4,502,407 | A * | 3/1985 | Stevens | E02B 17/0034 348/81 |
| 2014/0300885 | A1* | 10/2014 | Debrunner | G01S 17/42 356/4.01 |
| 2015/0307173 | A1* | 10/2015 | Moles | B63G 8/001 114/330 |

* cited by examiner

*Primary Examiner* — Eric W Golightly
(74) *Attorney, Agent, or Firm* — Steven A. Nielsen; www.NielsenPatents.com

(57) ABSTRACT

Exemplary embodiments of the present disclosure directed towards a non-destructive device configured to survey, inspect, and clean marine growth, comprising: manipulators comprising adjustable clamps configured to move or rotate 360 degrees for holding at least one cylindrical shape of an offshore structure; a plurality of hydraulic rams configured to hydraulically operate and control the plurality of manipulators; a central part comprising a camera and light emitting diodes configured to provide visual aid to a user and a lidar configured to determine ranges by targeting the offshore structure with a laser and measure the time for reflected light to return to a programming logic circuit board; probes configured to survey angular and distance measures of objects around the offshore structure, and inspections of safety and security of the offshore; and a high pressure jetting nozzle configured to clean the marine growth and rotary arms of the offshore structure.

5 Claims, 3 Drawing Sheets

NON-DESTRUCTIVE DEVICE AND METHOD FOR SURVEYING, INSPECTION, AND CLEANING MARINE GROWTH AROUND OFFSHORE STRUCTURE

TECHNICAL FIELD

The disclosed subject matter relates generally to a device for traversing and inspecting the underwater surface of offshore structures. More particularly, the present disclosure relates to a non-destructive device clamped to an offshore structure for surveying in a splash zone, inspection, and marine growth cleaning of underwater around the offshore structure and method employed thereof.

BACKGROUND

Generally, a multipurpose support vessel (MSV) or dive support vessel (DSV) is mobilized with divers, support staff, competent crew, equipment, and sufficient spares or consumables for carrying out inspections, surveys, marine growth removal, etc. The MSV on arrival at the location shall carry out relevant ship and equipment related testing and checks upon confirmation under favoring weather conditions the deployment of divers shall commence by compressing the divers to the required water depth. The inspection of mooring lines, umbilical cables, pipelines, jacketed structures, and risers is important to determine whether repairs may be required and to ensure the safety of those working in such environments. During the diver deployment and working stage, the MSV is supposed to maintain its position with 2-meter radial accuracy at proximity (for example, 10 meters) of the structure, any loss or deviation in position keeping shall abort the diving operations.

Existing methods and systems are configured to carry out maintenance of the subsea structure of an offshore platform for underwater surveying, and cleaning. In challenging weather conditions, divers need to swim to analyze the seabed/underwater. Operating various life support equipment like heliox gas (helium-oxygen mixture), pressure-sensitive dive chambers, pressure regulating systems gas reclamation, and temperature regulating equipment by crew member/operator to save the life of a diver. This crewmember or operator needs to be on standby all the time to support ship's diving operations through ships. But this laborious to coordination all auxiliary services.

Other existing methods or systems include remotely operated vehicles (ROV) for inspection, which are deployed through ships or by the offshore structure decks. But the remotely operated vehicles are not catered to sea surface due to wave and sea motions. The remotely operated vehicles require special attachments for each operations phase of a job, it is a time-consuming process for each dive. Powering, maintaining, and training such sensitive robotic equipment is highly expensive or time-consuming, and back-breaking.

Furthermore, the existing method of dynamically operated ships when working alongside the platform, when loose propulsion or power, loss of position occurs thus allusion with the structure may arise in such cases loss or damage of platform and ship may occur a chain reaction when starts may lead to multiple fatalities, loss of platform. A great loss to an environment (marine pollution) did happen on several occasions in the past.

Moreover, existing vessels of DP2 (dynamical positioning ships of class 2 or more) dive support vessels and remotely operated vehicles (ROV) support is required. These ships are expensive to build and highly technical. Specially built to sustain and support divers under pressure inside saturation chambers. Mobilization, maintenance, and operation of these ships are quite complex and mammoth of a task.

In addition, people run ships and equipment, equipment requires consumables and maintenance. Consumables and maintenance to be carried out in time. A robust network of the logistical supply chain is needed to provide food drinking water, fuel, lube oil, spares, consumables, repatriation of the crew, emergency services, etc.

In the light of the aforementioned discussion, there exists a need for a certain reconfigurable deployer system that would overcome the above-mentioned challenges.

SUMMARY

The following presents a simplified summary of the disclosure in order to provide a basic understanding of the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Exemplary embodiments of the present disclosure are directed towards a non-destructive device for surveying, inspection, and cleaning marine growth around an offshore structure and the method employed thereof.

An objective of the present disclosure is directed towards the non-destructive device is equipment that resembles a 4-legged Crab and performs a survey, inspection, and cleaning works without the need of a multipurpose support vessel (MSV).

Another objective of the present disclosure is directed towards the non-destructive device that can be deployable for an extended amount of time without any depth limitations.

Another objective of the present disclosure is directed towards the non-destructive device that can be left in the water for extended periods without being retrieved as any normal remote operating vehicle.

Another objective of the present disclosure is directed towards the non-destructive device that withstands any weather condition such as sea current, forces of wave motions, tidal currents, underwater poor visibility, which are governing factors to carrying out the job with the help of diver or ROV is not an aspect to consider since the non-destructive device is clamped to the structure hydraulically.

Another objective of the present disclosure is directed towards the non-destructive device that deploys from the platform via cables and wires.

Another objective of the present disclosure is directed towards the non-destructive device that can be made up of materials that are non-polluting agents to the marine environment.

Another objective of the present disclosure is directed towards the non-destructive device can be made up of a rust-proof alloy that can withstand corrosion in salt and fresh water.

Another objective of the present disclosure is directed towards the non-destructive device has manipulators which are hydraulically operated and electronically controlled.

Another objective of the present disclosure is directed towards an adjustable clamp and its housing assembly moves or rotates 360 degrees.

Another objective of the present disclosure is directed towards the Lidar sensor measures the distance.

Another objective of the present disclosure is directed towards the non-destructive device walks and crawls on the offshore structure of the platform in various axis.

Another objective of the present disclosure is directed towards the non-destructive device that enables an operator to operate, view, measure, control, survey, inspect and clean the offshore structure.

Another objective of the present disclosure is directed towards the non-destructive device that reduces cost, low risk for human life, safety and reliability using an unmanned procedure.

Another objective of the present disclosure is directed towards the non-destructive device that surveys, inspects, and marine growth removal around the offshore structure without any assistance.

According to an exemplary aspect of the present disclosure, a non-destructive device configured to survey, inspect, and clean marine growth around an offshore structure, comprising a plurality of manipulators comprising a plurality adjustable clamps configured to move or rotate 360 degrees for holding at least one cylindrical shape of an offshore structure.

According to an exemplary aspect of the present disclosure, the non-destructive device comprising a plurality of hydraulic rams configured to hydraulically operate and control the plurality of manipulators.

According to an exemplary aspect of the present disclosure, a central part of the non-destructive device comprising a camera and light emitting diodes configured to provide visual aid to a user and a lidar configured to determine ranges by targeting the offshore structure with a laser and measure the time for reflected light to return to a programming logic circuit board.

According to an exemplary aspect of the present disclosure, the non-destructive device comprising at least one high pressure jetting nozzle configured to clean the marine growth and rotary arms of the offshore structure.

BRIEF DESCRIPTION OF THE DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION OF EXAMPLE EMBODIMENTS

Figure 1:
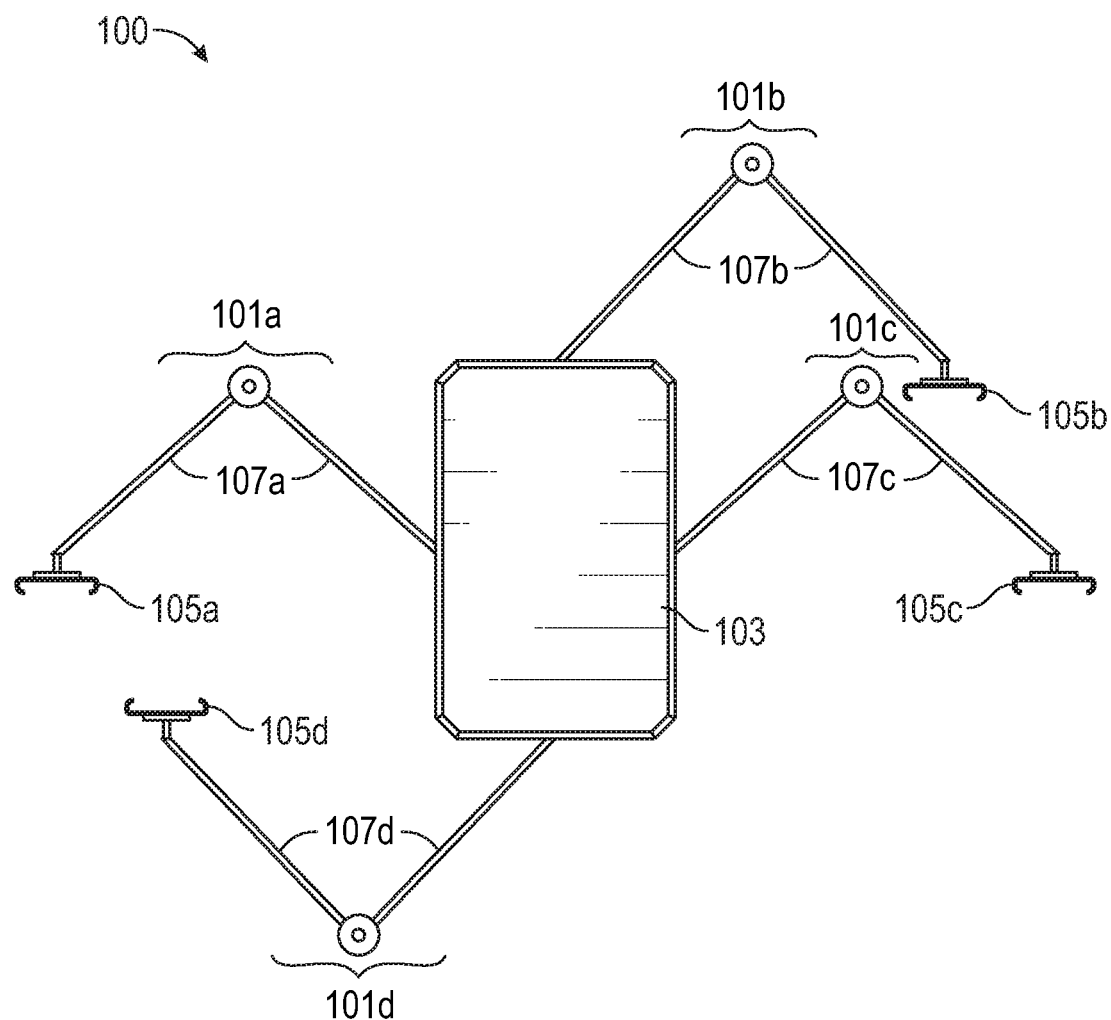
FIG. 1 is a diagram depicting a non-destructive device for surveying, inspection, and cleaning marine growth, in accordance with one or more exemplary embodiments.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1 is a diagram 100 depicting a non-destructive device for surveying, inspection, and cleaning marine growth, in accordance with one or more exemplary embodiments. The non-destructive device 100 includes manipulators 101a, 101b, 101c, 101d, a central part 103, clamps 105a, 105b, 105c, 105d, and hydraulic rams 107a, 107b, 107c, 107d. The central part 103 includes a programmable logic controller (PLC) circuit board 109 (not shown), a camera (lidar integrated) 111 (not shown), light emitting diodes (LEDs) 113 (not shown), probes 115 (not shown). The manipulators 101a, 101b, 101c, 101d may be configured to hydraulically operated and electronically controlled by the hydraulic rams 107a, 107b, 107c, 107d. Each of the manipulators 101a, 101b, 101c, 101d has a hydraulically operated adjustable clamp 105a, 105b, 105c, 105d which may hold any cylindrical structure of designed diameter, each clamp 105a, 105b, 105c, 105d and its housing assembly may move or rotate 360 degrees for effective inspection, surveying and marine growth cleaning. In another embodiment, each clamp 105a, 105b, 105c, 105d and its housing assembly may rotate in a predetermined direction. The predetermined direction may include, but not limited to, left direction, right direction, forward direction, backward direction, up, down, inclined, and the like. Each clamp 105a, 105b, 105c, 105d when engaged shall take the load of the overall equipment. Under working condition such manipulators 101a, 101b, 101c, 101d when engaged may be enough to take dynamic and static forces induced on the non-destructive device 100. The non-destructive device 100 may be made of a rust proof alloy which may withstand corrosion in salt and fresh water.

In accordance with one or more exemplary embodiments, the PLC circuit board 107, the camera (lidar integrated) 109, light emitting diodes 111, probes 113 may be configured to survey (for example, angular and distance measuring) and inspections (for example, non-destructive testing), a high-pressure jetting nozzle for cleaning of the marine growth and a rotary arm. The camera 109 and the light emitting diodes 111 being primary means of visual aid, lidar may be secondary means of visual aid and measuring equipment. With the help of the manipulators 101a, 101b, 101c, 101d, the non-destructive device 100 may walk or crawl on the subsea structure of the platform in various axis. The probes 115 (not shown) may include, but not limited to, alternating current field measurement (ACFM), unit model U 41 or similar models from Eddyfi, a cathodic protection (CP) meter, Lidar, underwater ultrasound thickness gauge by cygnus, high pressure water jet equipment or hydro blaster, and the like. The alternating current field measurement (ACFM) is an electromagnetic technique used for the detection and sizing of surface breaking cracks in metallic components and welds. The ACFM probe may introduce an electric current locally into the part and measure the associated electromagnetic fields close to the surface. The cathodic protection (CP) meter may be configured to determine the corrosion of subsea structures. The cathodic protection (CP) meter may be also configured to provide a consistent way of determine the corrosion of subsea structures. The cathodic protection (CP) meter may provide the divers with a direct readout of corrosion potential at the point of application. The cathodic protection (CP) meter may be also connected to a surface display unit to give topside readings.

In accordance with one or more exemplary embodiments, the PLC circuit board 109 (not shown) may be configured to control the hydraulic equipment necessary to control the movements of the hydraulic rams 107a, 107b, 107c, 107d, the manipulators 101a, 101b, 101c, 101d, and the clamps 105a, 105b, 105c, 105d. The PLC circuit board 107 (not shown) may be also configured to control the power and movement of the probes 115. Furthermore, the PLC circuit board 107 (not shown) may be configured to control the LEDs 113 (not shown). The manipulators 101a, 101b, 101c, 101d, the clamps 105a, 105b, 105c, 105d, and the hydraulic rams 107a, 107b, 107c, 107d may include joints which are flexible to make the crawling possible.

Figure 2:
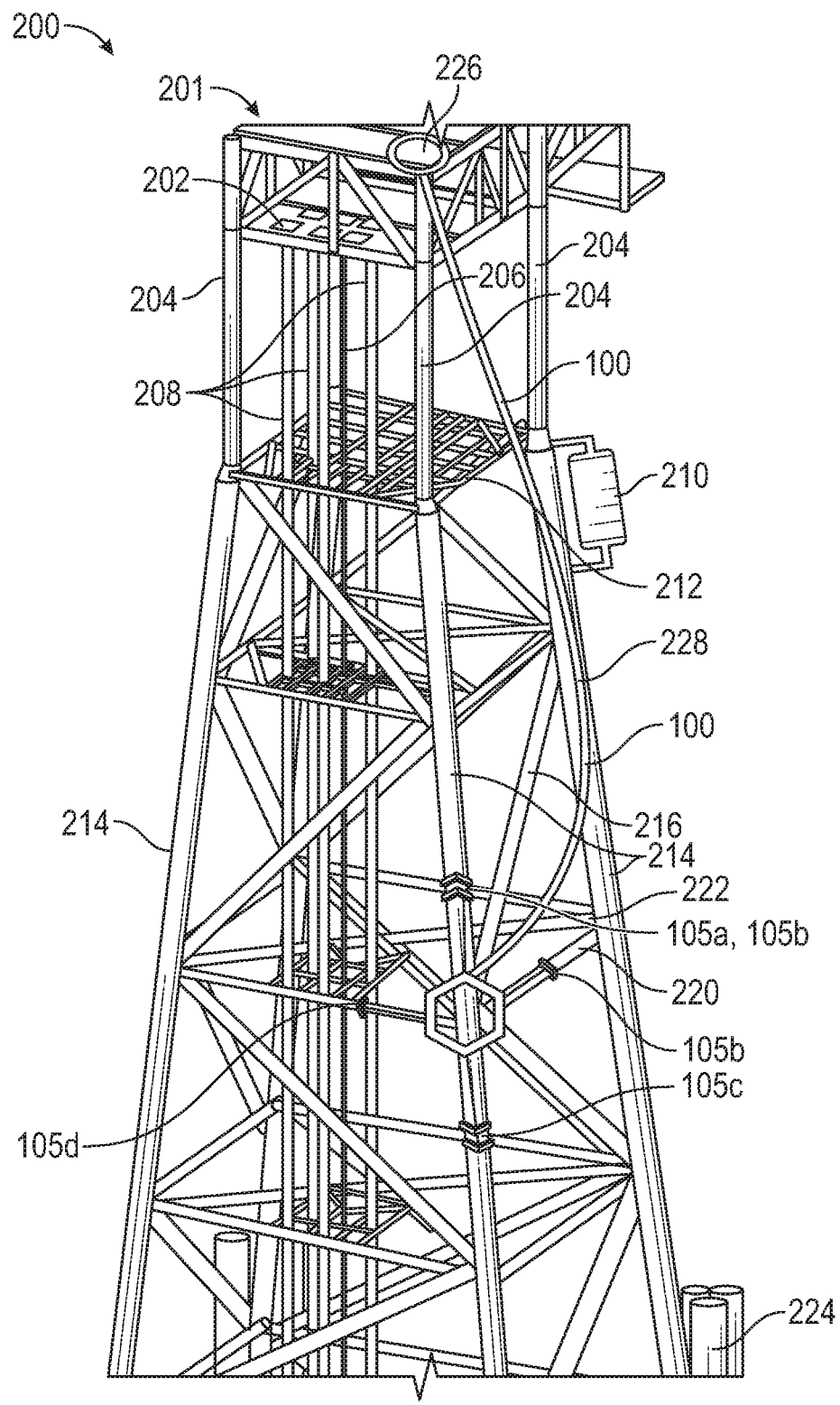
FIG. 2 is an example diagram depicting an embodiment of a non-destructive device on an offshore structure, in accordance with one or more exemplary embodiments.

Referring to FIG. 2 is an example diagram 200 depicting an embodiment of a non-destructive device on an offshore structure, in accordance with one or more exemplary embodiments. The offshore structure 201 includes a main deck 202, deck legs 204, pipeline and risers 206, conductors 208, a barge bumper 210, a conductor frame 212, jacket legs 214, a diagonal-in-vertical brace 216, a diagonal-in-horizontal brace 218, a horizontal brace 220, a leg-brace node 222, and skirt pile sleeve clusters 224. The non-destructive device 100 includes a van 226, an umbilical 228, clamps 105a, 105b, 105c, 105d, and the central part 103 of the non-destructive device 100.

In accordance with one or more exemplary embodiments, the main deck 202 may be located at an elevation of predefined distance above sea level. The main deck 202 may be provided with deck legs 204 to support the topside. The pipeline and risers 206 may be located on the main deck 202. The pipeline and risers 206 may include large inventories of oil or gas. The barge bumper 210 may be a cylindrical bumper. The barge bumper 210 may be mounted on the at least one deck leg 204. The conductor frame 212 may be removably attached to the jacket legs 214. The conductors 208 may be installed at corner slots of the main deck 202 using a platform crane. A segment of the brace assembly may be defined by the diagonal-in-vertical brace 216, the diagonal-in-horizontal brace 218, the horizontal brace 220, and the leg-brace node 222. The skirt pile sleeve clusters 224 may be rigidly connected to each jacket leg 214 through horizontal and vertical plates.

In accordance with one or more exemplary embodiments of the present disclosure, the umbilical 228 may be coupled to the offshore structure 201, the umbilical 228 may include terminating ends and the umbilical 228 may be a tubular umbilical. The control van 226 on the main deck 202 from which an operator interface manages to operate or view or measure or control or survey or inspect and clean the offshore structure 201. With the help of hydraulic rams 107a, 107b, 107c, 107d and the clamps 105a, 105b, 105c, 105d, the non-destructive device 100 may walk or crawl on the offshore structure 201 in various axis. The non-destructive device 100 has to be deployed from the main deck 202 of the platform through swingout arm till the equipment is clamped to the offshore structure 201. The mobilization of the non-destructive device 100 may not require a multipurpose support vessel as it may be transported by a boat due to its small size and weight. The non-destructive device 100 may be designed to be operated by 2-3 crew. The non-destructive device 100 may be designed to be operate by two to three crew.

Figure 3:
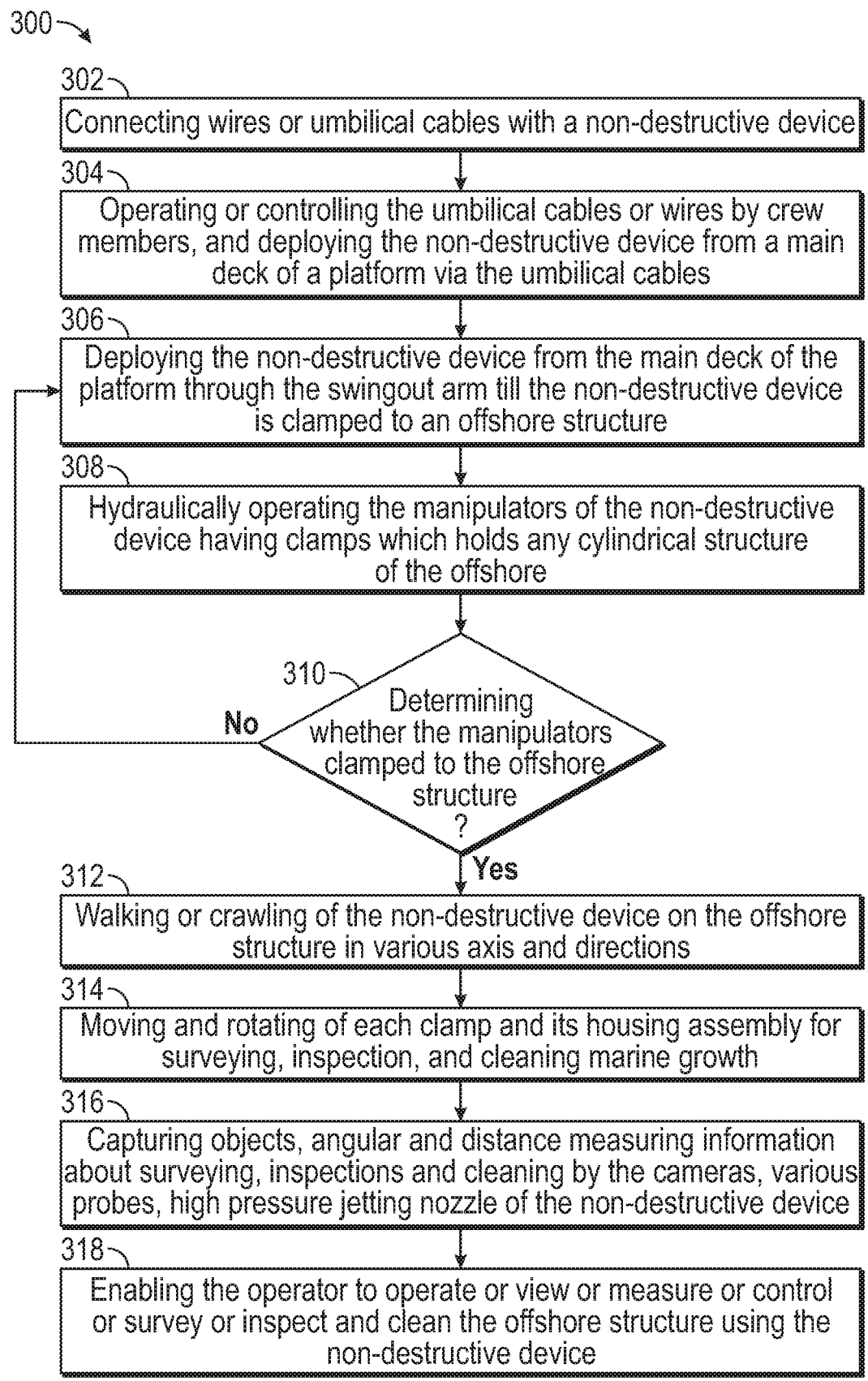
FIG. 3 is a flow diagram depicting a method for surveying, inspection, and cleaning marine growth, in accordance with one or more exemplary embodiments.

Referring to FIG. 3 is a flow diagram 300 depicting a method for surveying, inspection, and cleaning marine growth, in accordance with one or more exemplary embodiments. The method 300 may be carried out in the context of the details of FIG. 1, and FIG. 2. However, the method 300 may also be carried out in any desired environment. Further, the aforementioned definitions may equally apply to the description below.

The method commences at step 302, connecting wires or umbilical cables with the non-destructive device. Thereafter at step 304, operating or controlling the umbilical cables or wires by crew members, and deploying the non-destructive device from the main deck of the platform via umbilical cables. Thereafter, at step 306, deploying the non-destructive device from the main deck of the platform through the swingout arm till the non-destructive device is clamped to the offshore structure. Thereafter at step 308, hydraulically operating the manipulators of the non-destructive device having clamps which holds any cylindrical structure of the offshore. Thereafter, at step 310, determining whether the manipulators clamped to the offshore structure. If answer to the step 310 is YES, the method continues at step 312, walking or crawling of the non-destructive device on the offshore structure in various axis and directions. If answer to the step 310 is NO, the method continues at step 306. Thereafter at step 314, moving and rotating of each clamp and its housing assembly for surveying, inspection, and cleaning marine growth. Thereafter at step 316, capturing images, angular and distance measuring information about surveying, inspections and cleaning by the cameras, various probes, high pressure jetting nozzle of the non-destructive device. Thereafter at step 318, enabling the operator to operate or view or measure or control or survey or inspect and clean the offshore structure using the non-destructive device.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A non-destructive device configured to survey, inspect, and clean marine growth, comprising:
a plurality of manipulators comprising a plurality of adjustable clamps configured to move or rotate 360 degrees for holding at least one cylindrical shape of an offshore structure, wherein the at least one cylindrical shape is selected from any cylindrical structure of designed diameter;

a plurality of hydraulic rams configured to hydraulically operate and control the plurality of manipulators;

a central part comprising a camera and light emitting diodes configured to provide visual aid to a user and a lidar configured to determine ranges by targeting the offshore structure with a laser and measure the time for reflected light to return to a programming logic circuit board, wherein the central part is configured to survey angular and distance measures of objects around the offshore structure, and inspections of safety and security of the offshore structure; and at least one hydro blaster configured to clean the marine growth and rotary arms of the offshore structure, wherein the manipulators, the hydraulic rams and the adjustable clamps include joints that are flexible to enable the non-destructive device to walk or crawl on the offshore structure in various axis and wherein the clamps attach to the offshore structure to enable the non-destructive device to walk or crawl on the offshore structure;

and wherein there are two sets of manipulators with each set comprising a first and second pivoting arm structure with each pivoting arm structure comprising:

a proximal section of a first hydraulic ram having a first end pivotally attached to the center piece and the proximal section of the first hydraulic ram having a second end pivotally attached to a joint, the pivotally attached joint pivotally attached to a first end of a distal section of the first hydraulic ram and the distal section of the first hydraulic ram having a second end pivotally attached to an adjustable clamp;

wherein the first set of manipulators is configured to be attached to the offshore structure by use of the adjustable clamps while the second set of manipulators move to another location upon the offshore structure to enable movement of the non-destructive device.

2. The non-destructive device of claim 1, wherein the plurality of adjustable clamps are configured to take a load of the non-destructive device and enough to take dynamic and static forces induced on the non-destructive device.

3. The non-destructive device of claim 1, further comprising a plurality of umbilical cables configured to enable an operator to deploy the non-destructive device from a main deck of a platform.

4. The non-destructive device of claim 3, further comprising a control van on the main deck from which an operator interface manages to operate-, view-, measure-, control-, survey-, inspect and clean the offshore structure.

5. The non-destructive device of claim 1, wherein the non-destructive device is deployable underwater for surveying, inspecting and cleaning the marine growth around the offshore structure without any depth limitations.

* * * * *